United States Patent [19]
Ushiro

[11] Patent Number: 5,222,421
[45] Date of Patent: Jun. 29, 1993

[54] CENTERING DEVICE

[75] Inventor: Saburo Ushiro, Gifu, Japan

[73] Assignee: Dainichi Kinzoku Kogyo Kabushiki Kaisha, Osaka, Japan

[21] Appl. No.: 825,269

[22] Filed: Jan. 24, 1992

[51] Int. Cl.[5] .......................... B23B 25/06; B23Q 1/24
[52] U.S. Cl. ........................ 82/164; 82/903; 279/4.02; 279/126; 279/133
[58] Field of Search ................ 82/170, 903, 162, 164; 279/4.02, 126, 133

[56] References Cited

U.S. PATENT DOCUMENTS

| | | | |
|---|---|---|---|
| 3,535,963 | 10/1970 | Dietl | 82/162 |
| 4,519,279 | 5/1985 | Ruggeri | 82/164 X |
| 4,754,673 | 7/1988 | Hiestand | 82/164 |
| 4,823,657 | 4/1989 | Welin-Berger | 82/164 X |
| 4,905,551 | 3/1990 | Blaimschein | 82/162 X |
| 5,058,468 | 10/1991 | Lessway | 82/164 X |

FOREIGN PATENT DOCUMENTS

| | | | |
|---|---|---|---|
| 19737 | 1/1991 | Japan . | |
| 0795858 | 1/1981 | U.S.S.R. | 82/170 |
| 1125117 | 11/1984 | U.S.S.R. | 82/162 |

*Primary Examiner*—Z. R. Bilinsky
*Attorney, Agent, or Firm*—Dennison, Meserole, Pollack & Scheiner

[57] ABSTRACT

A centering device in a machine tool having a chuck for clamping a work includes a clamp device for clamping and centering the work at a different position with respect to the chuck. The clamp device has an actuator driven by a pressure medium and a holder operable by the actuator for clamping the work with a pressure corresponding to the pressure of the pressure medium and for releasing the work. A control device is provided for controlling the pressure of the pressure medium to a value which is appropriate to center the work by the clamp device and which is previously determined according to a diameter of the work to be clamped.

4 Claims, 3 Drawing Sheets

CENTERING DEVICE

BACKGROUND OF THE INVENTION

1. Field of the Invention

The present invention relates to a centering device for use with a machine tool, particularly for use with a lathe.

2. Description of the Prior Art

A conventional lathe includes a headstock having a chuck and a tailstock having a tailstock spindle. A work is held between the chuck and the tailstock spindle and is rotated by the headstock so as to be turned by a cutting tool. A clamp device is provided between the chuck and the tailstock spindle for clamping and centering the work during turning operation by the cutting tool while permitting rotation of the work. A clamping force of the clamp device is originated by a pressure medium such as a hydraulic fluid or a compressed air.

The clamping force applied to the work by the clamp device is, however, constant even if the diameter of the work has been changed or decreased through a turning operation. This may cause inaccurate centering of the work and therefore, it was difficult to precisely turn the work with the conventional clamp device.

SUMMARY OF THE INVENTION

It is, accordingly, an object of the present invention to provide a centering device which can accurately center a work.

According to the present invention, there is provided a centering device in a machine tool having a chuck for clamping a work, comprising:

a clamp device for clamping and centering the work at a different position with respect to the chuck, the clamp device including an actuator driven by a pressure medium and a holder operable by the actuator for clamping the work with a pressure corresponding to the pressure of the pressure medium and for releasing the work; and a control device for controlling the pressure of the pressure medium to a value which is appropriate to center the work by the clamp device and which is previously determined according to a diameter of the work to be clamped.

The invention will become more fully apparent from the claims and the description as it proceeds in connection with the drawings.

DETAILED DESCRIPTION OF THE PREFERRED EMBODIMENT

Figure 1:
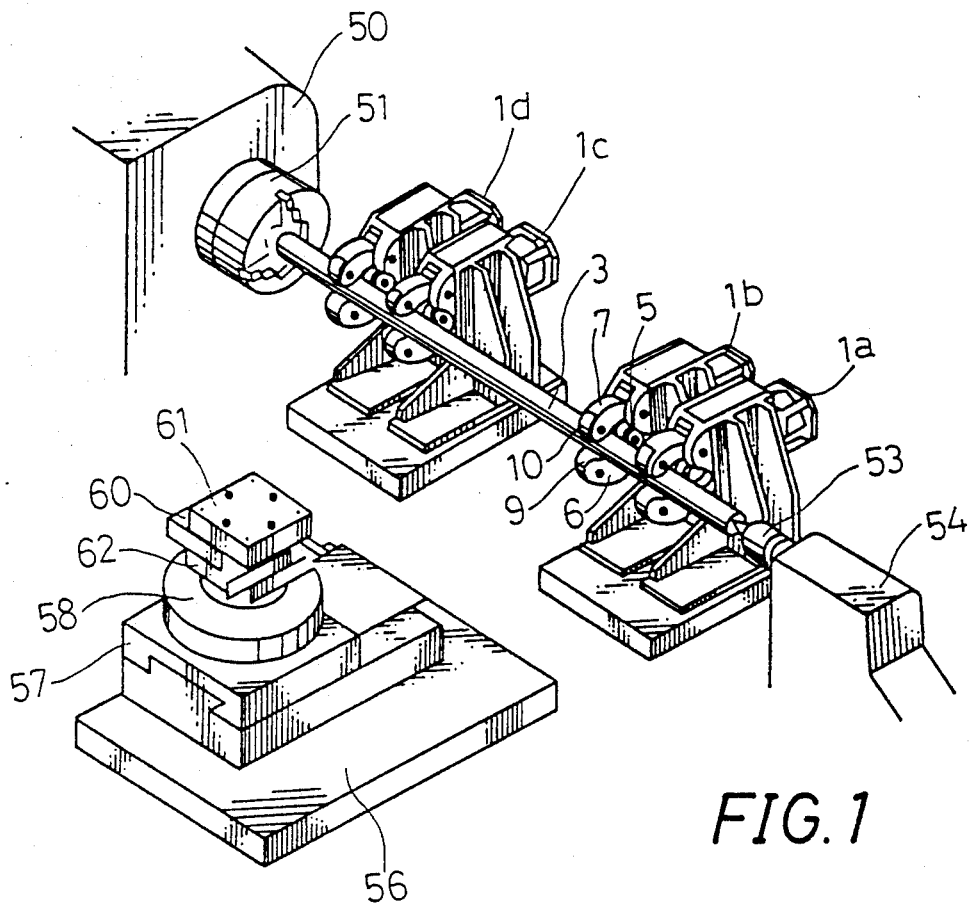
FIG. 1 is a schematic perspective view of a lathe incorporating a centering device according to an embodiment of the present invention.

Referring to FIG. 1, there is shown a perspective view of a main part of a lathe having clamp devices 1a to 1d according to an embodiment of the present invention. The lathe includes a headstock 50 having a chuck 51 and a tailstock 54 having a tailstock spindle 53. A work 3 is held between the chuck 51 and the tailstock spindle 53 with one end clamped by the chuck and with the other end abutted on the tailstock spindle 53. The headstock 50 includes a drive device (not shown) for rotation of the work 3. The clamp devices 1a to 1d are positioned in series along a longitudinal direction of the work 3 between the headstock 50 and the tailstock 54. Each of the clamp devices 1a to 1d includes clamp members 5, 6 and 7 having at their end portions rollers 8, 9, 10, respectively, which rotatably contact the work 3 for centering and bracing the same.

A longitudinal slide 56 is movable in a longitudinal direction of the work 3 and is served to move a tool holder 62 which includes a holder plate 61 for fixedly mounting a plurality of cutting tools 60 thereon. The tool holder 62 is fixedly mounted on a rotary table 58 which is rotatably mounted on a cross slide 57. The cross slide 57 is mounted on the longitudinal slide 56 and is movable in a direction perpendicular to the longitudinal direction of the work 3 relative to the longitudinal slide 56. Thus, any of the cutting tools 60 can be oriented toward the work 3 through rotation of the rotary table 58 and can be moved along the work 3 in the longitudinal direction thereof by the longitudinal slide 56 for cutting the same while it can be moved to be fed by the cross slide 57 for turning the work 3 to have a predetermined diameter.

Figure 2:
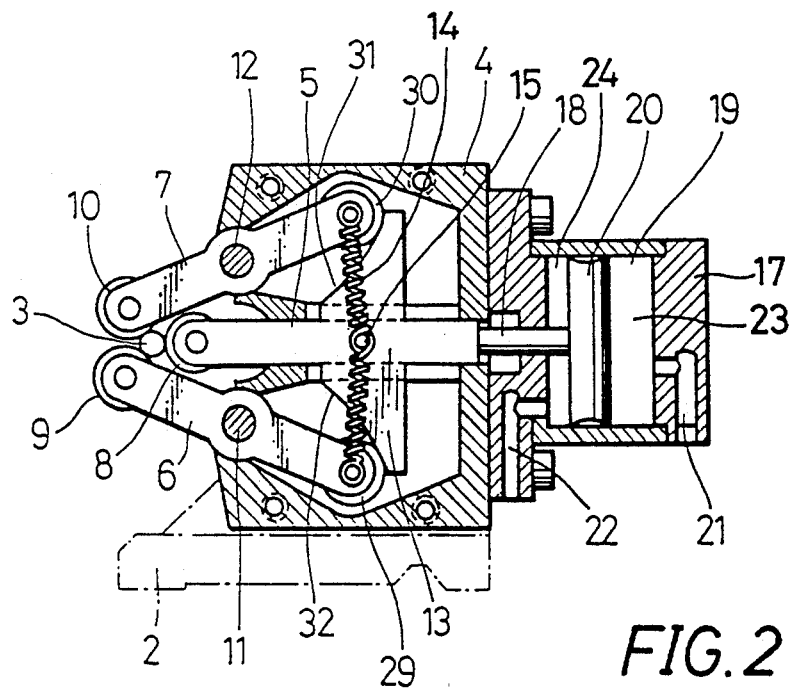
FIG. 2 is a sectional view of a clamp device shown in FIG. 1.

The detailed construction of each of the clamp devices 1a to 1d will now be explained with reference to FIG. 2. The constructions of the clamp devices 1a to 1d are the same, and therefore, FIG. 2 shows only the construction of the clamp device 1a. The clamp device 1a is so constructed as to clamp and/or support the work 3 and includes a casing 4 mounted on a base 2. The clamp members 5, 6 and 7 and their related operation members are disposed within the casing 4. The clamp member 5 is movable in the direction perpendicular to the longitudinal direction of the work 3 and is operably connected with the clamp members 6 and 7. The clamp members 6 and 7 are pivotally supported by the casing 4 through bolts 11 and 12 at positions upwardly and downwardly of the clamp member 5, respectively. The rollers 8, 9 and 10 are mounted on forward ends of the clamp members 5, 6 and 7, respectively, and contact the work 3 at positions substantially equally spaced from each other in a circumferential direction of the work 3. The rollers 8, 9 and 10 may rotate as the work 3 is rotated, so that frictional force on the work 3 may be reduced. A prism-like control member 13 and a tension spring 14 are provided to cooperatively connect the clamp members 6 and 7 with the clamp member 5. The control member 13 is fixed to the clamp member 5 and includes inclined surfaces 31 and 32 on a front side thereof. The clamp members 6 and 7 include at rear ends thereof rollers 29 and 30 for contacting the inclined surfaces 32 and 31 of the control member 13, respectively. One end of the tension spring 14 is connected with the rear end of the clamp member 6 and the other end of the same is connected with the rear end of the clamp member 7, so that the rollers 29 and 30 are kept in contact relation to the inclined surfaces 32 and 31, respectively. The central portion of the tension spring 14 is supported by a pin 15 mounted on the control member 13.

A cylinder 17 is mounted on a rear end of the casing 4 and includes a piston 20 therein. The piston 20 has a piston rod 18 which is connected with the rear end of the clamp member 5. The cylinder 17 is separated by the piston 20 into two chambers 23 and 24 to which a pressure medium or a hydraulic fluid can be supplied through channels 21 and 22 formed in the cylinder 17, respectively. Thus, the piston 20 is moved forwardly when the hydraulic fluid is supplied into the chamber 23 through the channel 21, while it is moved rearwardly when the hydraulic fluid is supplied into the chamber 24 through the channel 22.

In operation, the piston 20 is normally kept at its most rearward position where the work 3 is permitted to be inserted between the rollers 8, 9 and 10. After insertion of the work 3, the piston 20 is moved forwardly, and the clamp member 5 as well as the piston rod 18 is moved for pressing the roller 8 on the work 3. As the clamp member 5 is moved forwardly, the clamp members 5 and 6 are pivoted around the bolts 11 and 12 through upward and downward movement of the rollers 29 and 30 along the inclined surfaces 32 and 31 of the control member 13, respectively, so that the rollers 9 and 10 disposed at the forward ends of the clamp members 6 and 7, respectively, can be pressed on the work 3. Thus, the work 3 can be clamped by the clamp members 5, 6 and 7 with the force corresponding to the force applied by the piston 20 at three positions which are substantially equally spaced from each other in a circumferential direction.

Figure 3:
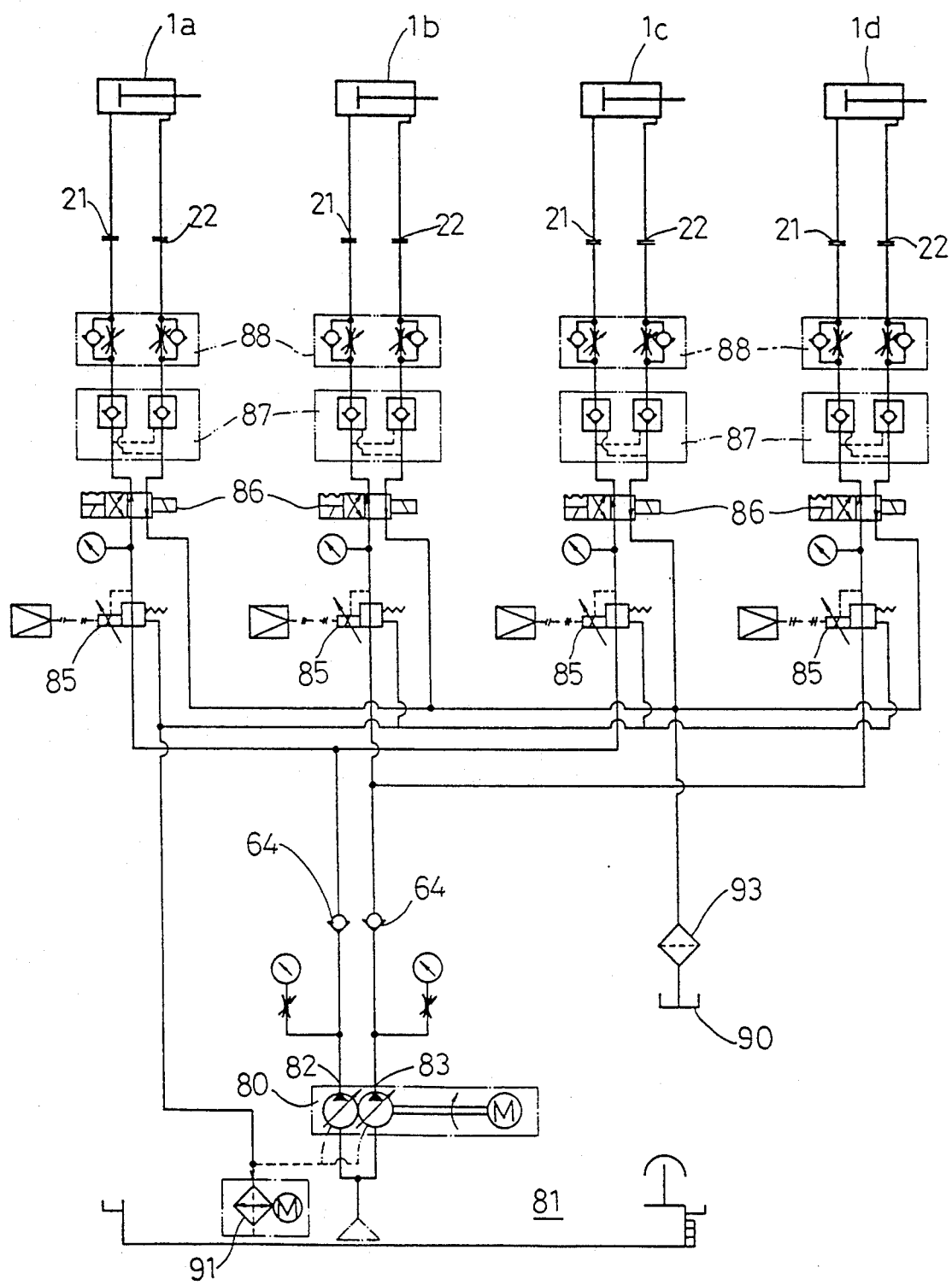
FIG. 3 is a schematic diagram of the hydraulic circuit of the clamp device shown in FIG. 2.

FIG. 3 shows a schematic diagram of the hydraulic circuit for controlling the hydraulic fluid to move the piston 20 of each of the clamp devices 1a to 1d. An oil pump 80 of a tandem type is provided to pump the hydraulic fluid from an oil tank 81 and to discharge the same through outlets 82 and 83. The hydraulic fluid discharged from the outlet 82 is supplied to the channel 21 of the cylinder 17 of the clamp device 1a via a check valve 64, a pressure control valve 85, a directional control valve 86, a double check valve 87 and a variable flow control valve 88 having a double check valve. The hydraulic fluid discharged from the channel 22 of the cylinder 17 is returned to the oil tank 90 via the variable flow control valve 88, the double check valve 87, the directional control valve 86 and a filter 93. Thus, the clamping force applied to the work 3 can be maintained or released through operation of the directional control valve 86. The variable flow control valve 88 controls the speed of movement of the piston 20. An excessive hydraulic fluid resulted from control by the pressure control valve 85 is returned to the oil tank 81 via a refrigerator 91. The configurations of portions of this circuit with respect to the clamp devices 1b to 1d are the same as that of the clamp device 1a excepting that the channels 21 of the clamp devices 1b and 1d disposed adjacent the clamp devices 1a and 1c, respectively, are connected with the outlet 83 of the oil pump 80. This may prevent interference between two adjacent clamp devices 1a and 1c and between two adjacent clamp devices 1b and 1d.

With the turning operation of the work 3 by the cutting tool 60, the work 3 is held between the chuck 51 and the tailstock spindle 53 and is rotated by the drive device while it is centered and braced by the clamp devices 1a to 1d. The cutting tool 60 is moved or fed by the cross slide 57 toward the work 3 to cut the same to an appropriate depth at a predetermined position. The cutting tool 60 is thereafter moved by the longitudinal slide 56 to cut the work 3 in the longitudinal direction with the appropriate depth. Such step of movement of the cutting tool 60 toward the work 3 and the subsequent movement in the longitudinal direction is repeated to turn the work 3 to have a predetermined diameter. The clamp devices 1a to 1d clamp the work 3 throughout the turning operation with the clamping force controlled by a control device shown in FIG. 4. According to the diameter of the work 3, the control device determines the pressure of the hydraulic fluid to be supplied to each of the clamp devices 1a to 1d based on a data stored therein. Such control by the control device is performed immediately after the cutting tool 60 has passed through the rollers 5, 6 and 7 of each of the clamp devices 1a to 1d.

Figure 4:
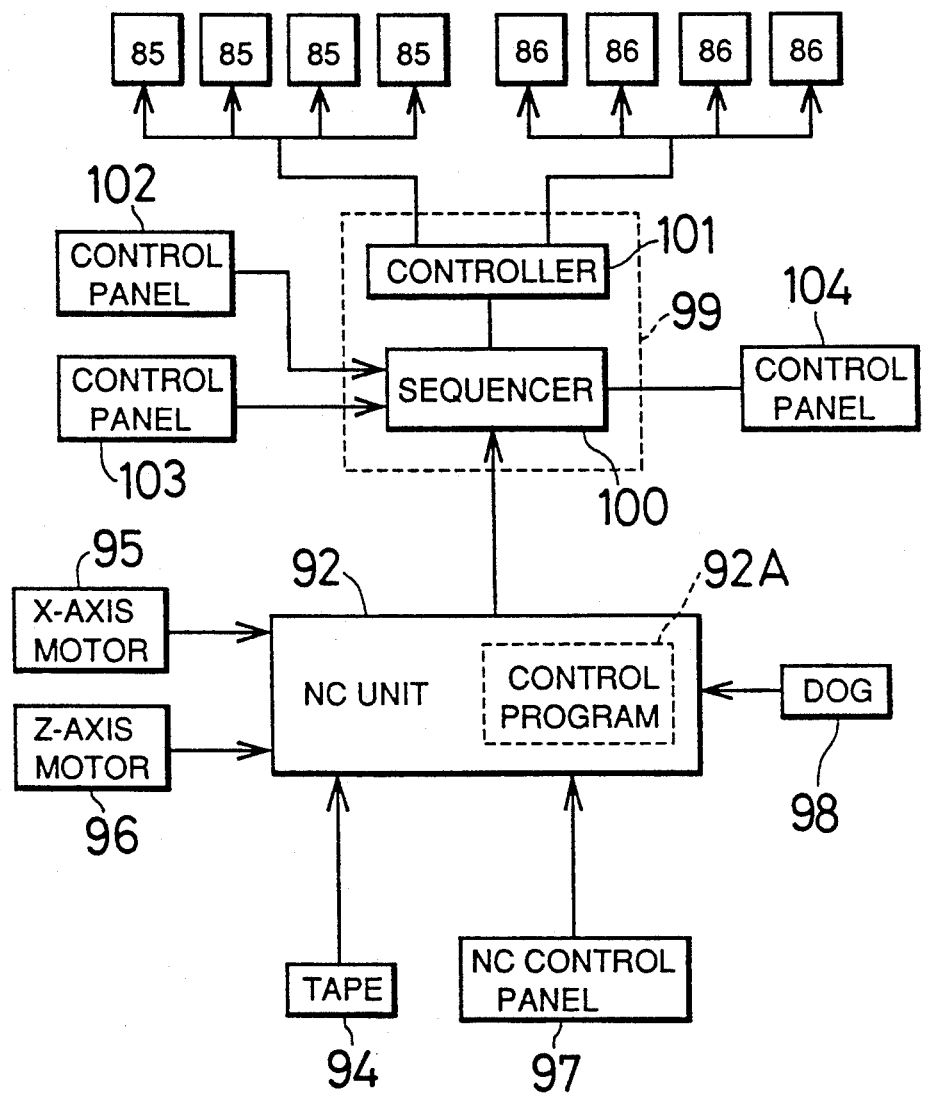
FIG. 4 is a block diagram of a control device for controlling the hydraulic circuit shown in FIG. 3.

The control device shown in FIG. 4 is applied where the lathe is an NC lathe and utilizes an NC control unit 92 equipped with the NC lathe.

The NC unit 92 stores a control program 92A for determining the pressure of the hydraulic fluid of the clamp devices 1a to 1d based on the data described above according to the diameter of the work 3. The control program 92A is also prepared for controlling the operation of the clamp devices 1a to 1d to start to clamp the work 3 or to release the same. A machining data is inputted to the NC unit 92 through a tape 94 for controlling the position of the cutting tool 60, etc., and based on this data, a Z-axis motor 95 and an X-axis motor 96 for movement of the cross slide 56 and the longitudinal slide 57 of the cutting tool 60, respectively, are controlled for machining the work 3. An NC control panel 92 is provided to input signals for starting and stopping the machining operation. A dog 98 is provided for determining the position to start control of the cutting tool 60 and for outputting the corresponding signal to the NC unit 92.

Based on the control program 92A, the NC unit 92 determines the pressure from a signal indicative of the position of the cutting tool 60 in a direction of the X-axis corresponding to the diameter of the work 3, and outputs pressure signals for the clamp devices 1a to 1d to a controller 100 of a control panel 99 through a sequencer 101. The controller 100 converts the pressure signals to corresponding current for operating the pressure control valves 85. Signals for controlling operation of the clamp devices 1a to 1d to clamp or to release the work 3 based on the control program 92A are also inputted to the sequencer 101 of the control panel 99 and are converted to corresponding current for control of the directional control valves 86.

Control panels 102, 103 and 104 are connected with the sequencer 101 of the control panel 99. The control panel 102 is provided for manually setting the value of the diameter of the work 3 to be clamped. The control panel 103 is provided for manually setting the pressure of the hydraulic fluid to be supplied to the clamp devices 1a to 1d. Thus, the provision of the control panels 102 to 104 permits manual operation of the clamp devices 1a to 1d.

Because of manufacturing tolerance or assembling tolerance of each of the clamp devices 1a to 1d, the pressure appropriate for centering the work 3 varies with the clamp devices 1a to 1d. Such pressure appropriate for centering the work 3 is measured for each of the clamp devices 1a to 1d after the clamp devices 1a to 1d have been assembled to the lathe. An example of the measured data is shown in the following table.

TABLE

| DIAMETER OF WORK (mm) | PRESSURE OF HYDRAULIC FLUID FOR CLAMP DEVICES (Kg/cm²) | | | |
|---|---|---|---|---|
| | 1a | 1b | 1c | 1d |
| 50 | 7.0 | 8.7 | 8.0 | 16.0 |
| 60 | 10.0 | 11.1 | 10.1 | 7.9 |
| 70 | 12.0 | 13.5 | 12.9 | 10.6 |
| 80 | 12.5 | 13.6 | 13.7 | 11.8 |
| 90 | 12.8 | 13.6 | 13.7 | 12.7 |
| 100 | 13.3 | 13.7 | 13.0 | 12.7 |
| 110 | 12.6 | 12.8 | 12.5 | 12.6 |
| 120 | 12.0 | 12.0 | 12.0 | 12.0 |
| 130 | 11.6 | 11.6 | 11.4 | 11.6 |
| 140 | 11.1 | 10.9 | 10.1 | 10.9 |
| 150 | 10.3 | 10.5 | 9.3 | 10.3 |
| 160 | 10.1 | 9.9 | 8.5 | 10.0 |
| 170 | 10.0 | 9.8 | 8.3 | 9.9 |
| 180 | 10.1 | 9.6 | 8.0 | 9.9 |
| 190 | 11.2 | 10.8 | 8.3 | 11.7 |
| 200 | 13.6 | 12.7 | 9.7 | 12.9 |

The measured data is stored in the control device as described above, and the pressure of the hydraulic fluid applied to the clamp devices 1a to 1d is determined by this data according to the diameter of the work 3.

Practically, in case of machining the work 3 having a diameter of 110 mm to have a diameter of 103 mm, on the assumption that the work 3 is cut by the depth of 1 mm through one cutting stroke of movement of the cutting tool 60, the diameter of the work 3 degrees by 2 mm through each cutting stroke. Each cutting stroke is performed in such a manner that the cutting tool 60 is firstly moved toward the work 3 by the cross slide 57 and is thereafter moved in the longitudinal direction of the work 3 by the longitudinal slide 56. With the first cutting stroke, after the cutting tool 60 is moved in the longitudinal direction to pass the clamping position by the clamp device 1a, the work 3 at this clamping position has a diameter of 108 mm (110 mm±2 mm). The control device 91 locates the pressure appropriate for centering the work 3 having the diameter of 108 mm based on the stored data or the table. However, with the table of this example, there is no data of pressure corresponding to the diameter of 108 mm. Such data corresponding to the diameter of 108 mm is calculated by interpolation from the data concerning two diameters which are analogous to the diameter of 108 mm and are larger and smaller than the same, respectively. Thus, the pressure of 12.6 Kg/cm² for the diameter of 110 mm and the pressure of 13.6 Kg/cm² for the diameter of 100 mm are utilized for calculation of the pressure P1 for the diameter of 108 mm according the following mathematical expression:

$$P1(Kg/cm^2) = (12.6 - 13.3)/(110 - 100) \times (110 - 108) + 13.3$$

The pressure control valve 85 of the clamp device 1a is therefor controlled by the control device to deliver the pressure P1 for clamping the work 3.

The cutting tool 60 is subsequently moved beyond the clamping position by the clamp device 1b, and the pressure control valve 85 of the clamp device 1b is controlled to deliver the pressure P2 which has been calculated from the pressure of 12.8 Kg/cm² for the diameter of 110 mm and the pressure of 13.7 Kg/cm² for the diameter of 100 mm in the same manner as the pressure P1. Thus, the pressure P2 is calculated from the following mathematical expression:

$$P2(Kg/cm^2) = (12.8 - 13.7)/(110 - 100) \times (110 - 108) + 13.7$$

The same control is subsequently performed in connection with the clamp devices 1c and 1d, and such control of the pressure of the clamp devices 1a to 1d is repeated throughout the steps for cutting the work 3 until the target diameter of 103 mm is obtained.

Thus, as the diameter of the work 3 is gradually decreased through turning operation by the cutting tool 60 to reach a target size, the clamping force of each of the clamp devices 1a to 1d is changed according to such change of the diameter of the work 3 to the value appropriate for centering the work 3, so that the work 3 can be precisely machined to have the target diameter.

Although with the above example, the data of the pressure stored in the control device have been obtained for the diameters at intervals of 10 mm, such data may be obtained for the diameters at narrower intervals. Further, the same centering control can be also performed even if the work 3 is machined to have different diameters in the longitudinal direction.

Additionally, although the above embodiment has been described in connection with a centering device for use with a lathe, the same centering device is also applicable to other machine tools such as a machining center and a drilling machine. Thus, the centering device of the above embodiment can be also used for any machine tools where a work is rotated during machining operation but is not machined for its outer diameter.

While the invention has been described with reference to a preferred embodiment, it is to be understood that modifications or variation may be easily made without departing from the spirit of this invention which is defined by the appended claims.

What is claimed is:

1. A centering device in a machine tool having a chuck for clamping a work, comprising:

a plurality of clamp devices for clamping and centering the work at different positions with respect to the chuck and with respect to each other in a longitudinal direction of the work, each of said clamp devices including an actuator driven by a pressure medium and a holder operable by said actuator for clamping the work with a pressure corresponding to the pressure of said pressure medium and for releasing the work; and a control device for controlling the pressure of said pressure medium of each of said clamp devices to a value which is previously determined to appropriately center the work to be clamped according to a diameter of the work and compensated for tolerances including manufacturing tolerance and assembling tolerance of each of said clamp devices.

2. The centering device as defined in claim 1 wherein said control device stores data of the pressure of said pressure medium appropriate for centering the work by each said clamp device with respect to change of diameter of the work, and wherein the pressure of the pressure medium is determined based on said data.

3. The centering device as defined in claim 1 wherein said pressure medium is a hydraulic fluid; said actuator is a piston operable by said hydraulic fluid; and a pressure control valve is provided in a hydraulic circuit connecting said piston with a hydraulic source and is controlled by said control device.

4. The centering device as defined in claim 1 wherein said machine tool is a lathe which includes a headstock having said chuck and a tailstock disposed in opposed relationship with said headstock and having a tailstock spindle; said head stock rotates the work with one end of the work clamped by said chuck and with the other end supported by said tailstock spindle for turning the work by a cutting tool; and the pressure control of said pressure medium supplied to each said clamp device is performed immediately after said cutting tool has been moved in a longitudinal direction for turning the work beyond a position where the work has been clamped by the corresponding said clamp device.

* * * * *